United States Patent [19]

Hasegawa

[11] E Patent Number: Re. 31,786

[45] Reissued Date of Patent: Jan. 1, 1985

[54] VENEER LATHE

[75] Inventor: Katsuji Hasegawa, Nagoya, Japan

[73] Assignee: Meinan Machinery Works, Inc., Ohbu, Japan

[21] Appl. No.: 496,855

[22] Filed: May 23, 1983

Related U.S. Patent Documents

Reissue of:

[64] Patent No.: 4,269,243
Issued: May 26, 1981
Appl. No.: 924,891
Filed: Jul. 17, 1978

[51] Int. Cl.[3] ..... B27L 5/02

[52] U.S. Cl. ..... 144/213; 144/209 R

[58] Field of Search ..... 144/209 R, 211, 212, 144/213, 214, 215, 365, 369

[56] References Cited

U.S. PATENT DOCUMENTS

| | | | |
|---|---|---|---|
| 463,888 | 11/1891 | Chapman | 144/211 |
| 633,548 | 9/1899 | Fenlason | 144/215 |
| 1,614,452 | 9/1927 | Osgood | 144/213 |
| 3,207,194 | 9/1965 | Hedberg et al. | 144/213 |
| 4,061,169 | 12/1977 | Hasegawa | 144/213 |
| 4,269,243 | 5/1981 | Hasegawa | 144/209 R |

*Primary Examiner*—W. D. Bray
*Attorney, Agent, or Firm*—Lackenbach, Siegel, Marzullo, Presta & Aronson

[57] ABSTRACT

An improved veneer lathe which cuts sheets of veneer from a turned log. A torque is applied to the log both by way of the spindle chuck holding its axial ends and by way of its outer periphery. During the cutting operation, the primary cause of log rotation is designed to be an external force applied to the log periphery by using an idling mechanism including a torque limiter, an overrunning clutch, etc.

17 Claims, 15 Drawing Figures

VENEER LATHE

Matter enclosed in heavy brackets [ ] appears in the original patent but forms no part of this reissue specification; matter printed in italics indicates the additions made by reissue.

BACKGROUND OF THE INVENTION

The present invention relates to a new construction of a veneer lathe. A conventional veneer lathe includes a cutting section made up of a knife and a stationary bar or a roller bar. A cutting power is transmitted to the cutting section through a spindle or chuck and the log itself. Known veneer lathes of the type have various drawbacks as discussed hereinbelow.

First, they are not suitable for cutting of hard logs, logs having soft cores or logs with splits and rots. If used with such a log, the chuck would only race disabling the power supply and the log would become unsuitable for use as veneer sheet. This is accounted for by the following reasons. The power supply against the high cutting resistance occurs commonly through the chuck positioned in a central area of a log. Logs grown in the South Seas and now being used for plywood generally have weak cores. A considerable force acts on part of a log where the chuck is positioned because the cutting resistance is transmitted to the core. To ensure chuck power transmission, the chuck must be pressed against opposite ends of the log with such a force which possibly break the log. Meanwhile, a log should be turned down to as is small a diameter as possible to obtain higher yield if the chuck diameter is preselected to be smaller than the intended minimum diameter of the log, but a decrease in the chuck diameter proportionally increases the probability of the chuck racing and log breakage with the consequent fall of the yield.

Second, various troubles are invited by slivers and chips of a log as well as veneer sheet which tend to become wedged between the log and the knife, between the log and the pressure bar and/or between the knife and the pressure bar. Veneer sheets cut off from a log in a wedged form will be of poor quality and in many cases be commercially unacceptable. The wedging also invites an abnormal increase in the cutting resistance and/or in the force with which the pressure bar and other press the log. Therefore, the log is very liable to be damaged unless the wedging is prevented appropriately and immediately. The above wedging phenomenon results particularly from the use of logs having rotten and/or soft spots and particularly logs having splits extending along the annual layers and those forming clearances. In addition to the degradation of the product quality and breakage of logs, the wedging will require a slow-down of the cutting operation or stoppage of the entire machine operation, bringing about a decrease of efficiency. The troubles mentioned above are showing a tendency to sharply increase.

The disadvantages of conventional veneer lathes discussed above are not only undesirable from the viewpoint of operation at factories but give rise to far more critical problems in the general field of plywood production. Since known veneer lathes are so constructed as to apply an excessively large external force to logs, logs must be suitably classified for plywood production using veneer lathes. Moreover, a number of logs are classified into grades before they are conveyed to the factories and unsuitable logs are not used for plywood production. Additionally, a large number of logs are usually classified as unsuitable in the producing districts. Thus, the material loss is serious matter and will become more prominent in the future.

SUMMARY OF THE INVENTION

It is therefore an object of the present invention to provide a new veneer lathe which precludes various shortcomings inherent in known veneer lathe constructions and is designed to cope with future shortage in the log supply.

A basic and characteristic feature of a veneer lathe according to the present invention resides in that a log cutting power is supplied positively to part of the outer periphery of a log which is somewhat ahead of the cutting edge of the knife or immediately ahead of the cutting section. The power supply to the log is mediated by a drive roller carrying a number of edge members thereon. The drive roller has a larger diameter than a known roller bar while being mounted in substantially the same position as the roller bar. To feed the power positively to the log, the drive roller is driven by a drive mechanism including a motor which is electrically, hydraulically or otherwise operated. The drive roller has on its outer periphery a plurality of annular grooves or recesses void of the edge members and, therefore, the edge members are arranged axially at moderate or substantial spacings. The inventor has arrived at the idea of a system which drives a log with a drive roller carrying a number of edge members on its outer periphery.

Experiments with use of such a system revealed that the performance of the system was beyond expectation. Extended studies and experiments on the performance of the edge members showed that they could be axially spaced a substantial distance apart. Consequently, it becomes possible to reduce the pressure on a log attributable to the penetration of the edge members which might otherwise have rendered the drive roller more disadvantageous than the conventional roller bar. The drive roller having a number of annular recesses according to the invention is derived from experiments.

The veneer lathe of the present invention further comprises a pressure bar as typified by a stationary bar, a roller bar or a double-face bar. The pressure bar is divided into a plurality of sections, which are received in the respective recesses of the drive roller, engageably with the log.

BRIEF DESCRIPTION OF THE DRAWINGS

The invention will now be further described in connection with the accompanying drawings, in which.

DESCRIPTION OF THE PREFERRED EMBODIMENTS

Figure 1:
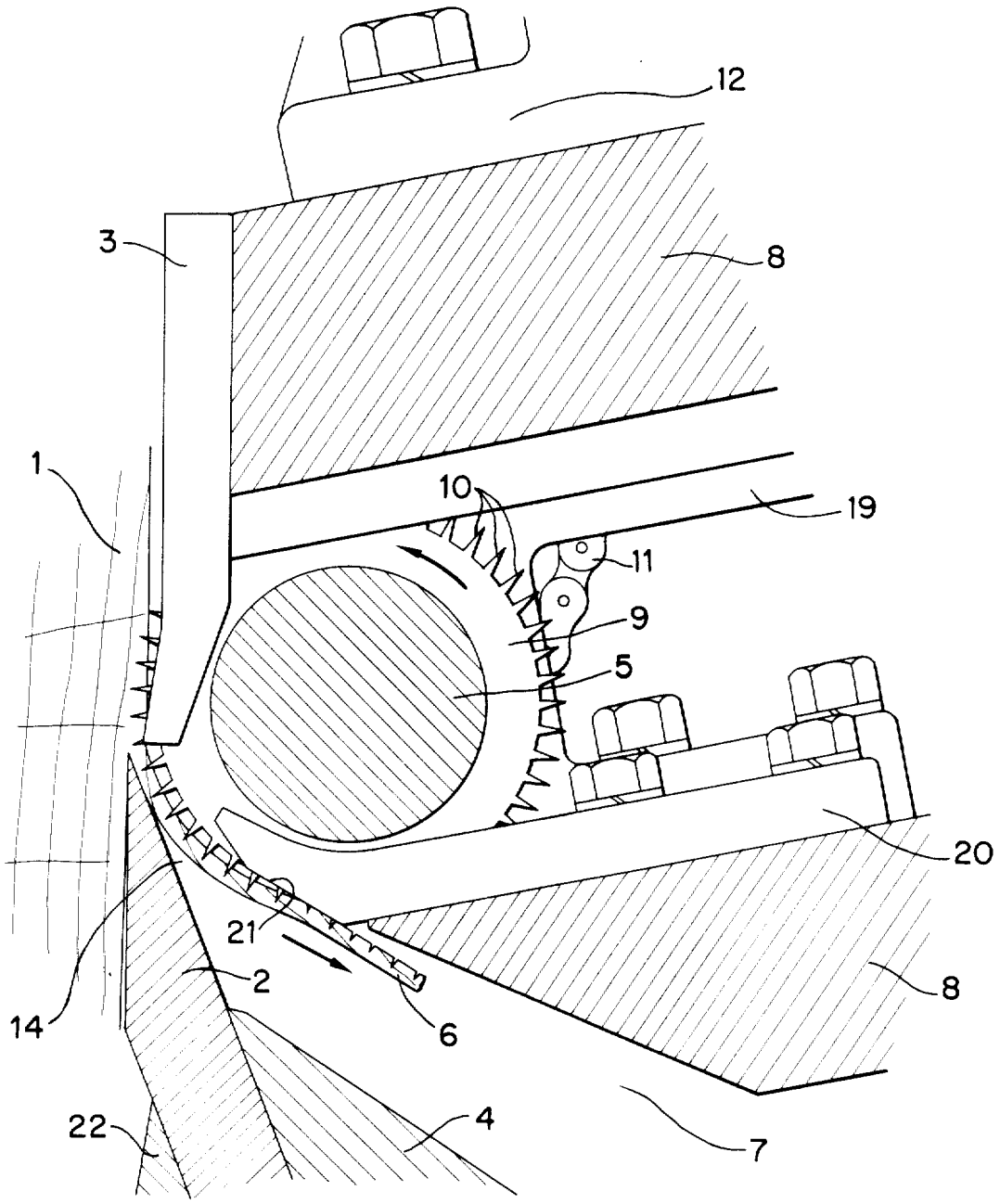
FIG. 1 is a fragmentary sectional side elevation of one embodiment according to the present invention.
Figure 2:
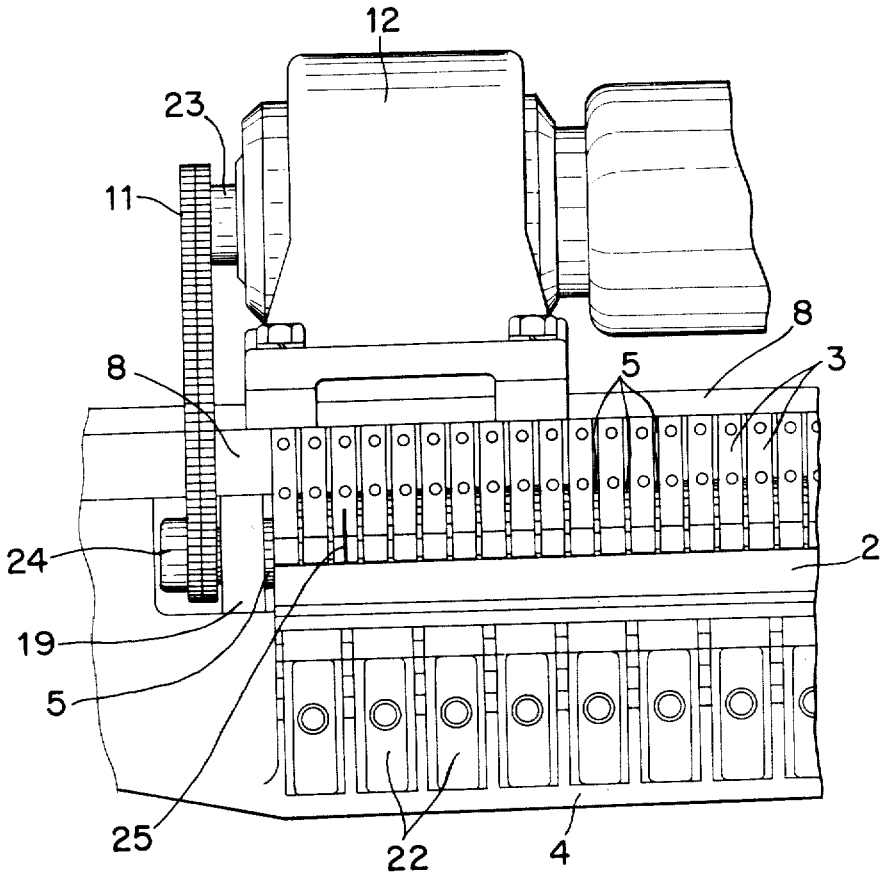
FIG. 2 is a front view of the above embodiment.

Referring now to FIGS. 1 and 2, a veneer lathe embodying the present invention generally comprises a knife support 4 for carrying a knife 2 rigidly therewith. A pressure bar support 8 is connected at opposite ends with the knife support 4. A passage 7 facilitates the passing of a veneer sheet. The knife support 4 or the pressure bar support 8 is provided thereon with a drive roller 5 having a number of edge members 10 and a plurality of annular recesses 9 on the outer periphery. Defined between the outer periphery of the drive roller 5 and the knife 2 on the support 4 or the support 4 itself is a path 14 which a veneer sheet 6 just cut off from a log travels. A pressure bar 3 mounted on the support 8 and divided into a plurality of sections or fingers received in the respective recesses 9 of the drive roller 5 has at least part thereof engagable with a log. The pressure bar 3 may take the form of any known configuration including a stationary bar, a roller bar and a double-face bar. A drive system for the drive roller 5 includes a chain 11 and an electrically or otherwise operated motor 12 which are mounted on the pressure bar support 8 or the knife support 4.

Figure 3:
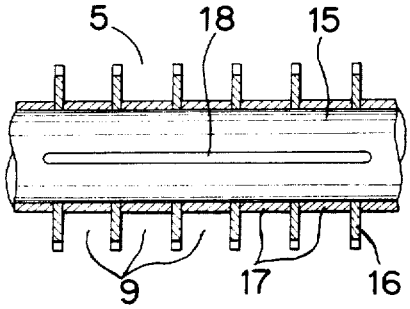
FIG. 3 shows an example of a drive roller used in the above embodiment.
Figure 4:
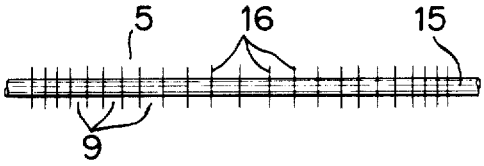
FIG. 4 shows an example of the arrangement of edge members carried on the drive of rollers of FIG. 3.
Figure 5:
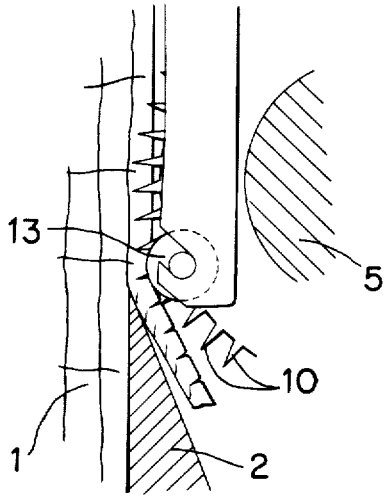
FIG. 5 illustrates another position of the drive roller relative to a log and a veneer sheet cut off therefrom.
Figure 6:
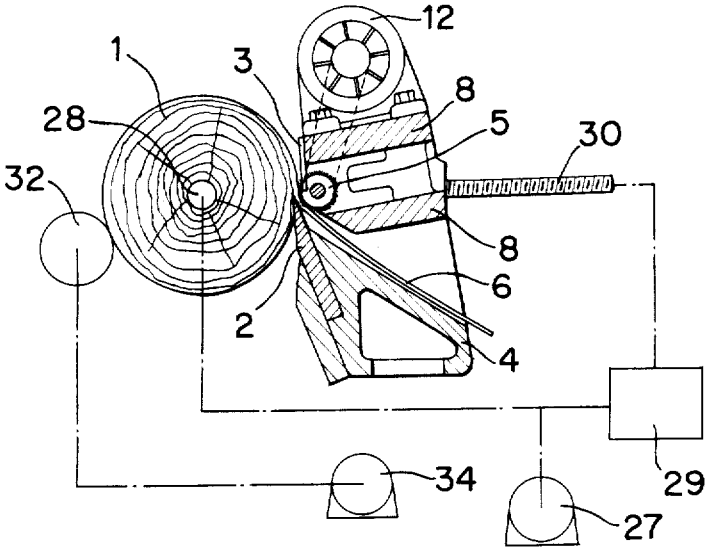
FIG. 6 shows an example of a drive system of the above embodiment.
Figure 10:
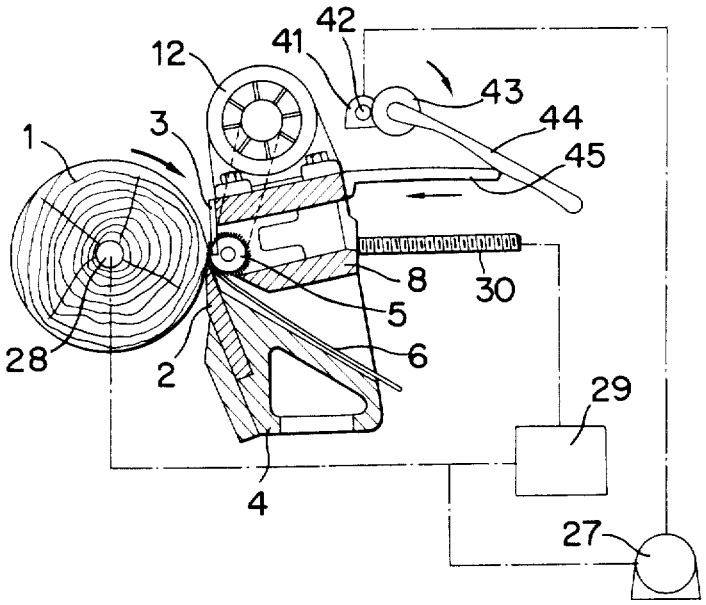
FIG. 10 illustrates another example of the drive system.

The supports 4 and 8 are connected with each other at opposite ends while leaving the clearance 7 for veneer sheet discharge and are movable integrally in accordance with the action of a feed mechanism (see FIGS. 6 and 10). The edges member 10 extend radially outward from the outer periphery of the drive roller in a plurality of rows (see FIG. 15) along the axis thereof. Preferably, the edge members 10 are inclined forwardly at a predetermined angle with respect to the intended direction of rotation of the drive roller so that a pressure force for causing them to cut into a log may be reduced for decreasing the possibility of damaging the log. 5-15 mm pitch for the edge members were chosen for the experiments. The drive roller 5 may have the edge members 10 formed integrally with a shaft using of a single material. Alternatively, it may comprise as shown in FIG. 3 an assembly made up of a shaft 15 and a circular saw element 16 carrying the edge members 10 on the outer periphery thereof. The roller assembly in FIG. 3 has advantages in that it facilitates easy machining of the respective elements and that use can be made of a strong material for the edge member 10. The element 16 of the drive roller includes annular spacers 17 each being adapted to define a spacing between neighboring edge members 10 which is to accommodate each finger of the pressure bar 3. The shaft 15 and the element 16 may be fixed together by and suitable means such as a key (not shown) and a key way 18 provided. The radial width of the edge members 10 is preferably 10 mm or less in consideration of the log driving ability, force for driving them into a log and machining efficiency. About 3 mm width was selected in experiments. The edge members 10 of the element 16 may be arranged equidistantly or, as seen in FIG. 4, more closely to each other toward at least one of the axial ends of the shaft 15. Such arrangement of edge members distributes a large proportion of a force for driving them into a log to the end portion or portions of the shaft 15 thereby favorably decreasing the possibility of bending the log. To avoid wedging of slivers and ships, the distance between neighboring edge members 10 should be as small as possible. This distance is set at 40 mm in our experiments. The drive roller 5 assumes a position above the cutting edge of the knife 2, above an imaginary line passing through the center of a spindles (not shown) and the cutting edge of the knife 2, in order to restrain the edge members 10 from contacting with the knife 2. In the abovementioned position, the edge members 10 on the drive roller may engage or cut into both part of a log immediately ahead of the cutting section and part of a veneer sheet immediately past the cutting section as indicated in FIG. 1 or, alternatively, only part of a log immediately ahead of the cutting section as shown in FIG. 5 is so located as to permit its edge members 10 to engage both the log and the veneer sheet, the edge members will tender the log to a significant degree. This way, the edge members are located nearer the cutting edge of the knife 2 and the depth to which the edge members 10 cut into the log varies little though the log diameter progressively decreases. This allows the drive roller 5 to be fixed in place relative to the knife support 4 or the pressure bar support 8. In cases where the drive roller is positioned further ahead of the cutting edge of the knife, the maximum cutting depth of the edge members 10 into a log can be set large though the tendering effect will be reduced and the cutting depth widely varied according to the change of the log diameter, this needing a mechanism for automatic adjustment of the cutting depth of the edge members. Regardless of the position, the drive roller 5 can be operated easily because bearings 19 rotatably supporting the drive roller 5 are mounted on the support 8 or 4 and movable integrally with the support by the action of a feed mechanism. The drive roller 5 may be supported by the bearings 19 not only at opposite ends but also at intermediate positions between opposite ends to suppress bending. The chain 11 driving the drive roller 5 may be replaced by gears or the like while the power may be supplied from one side or both sides or the intermediate of the shaft. The motor 12 is mounted on the pressure bar support 8 or the knife support 4 so as to be movable integrally therewith. Though this is not always a prerequisite, the integral structure of the motor and the support will simplify the drive mechanism significantly and therefore enhance the operation efficiency. The pressure bar 3 may comprise a stationary bar shown in FIG. 1, a roller bar indicated in FIG. 5 by reference numeral 13 or a double-face bar indicated in FIG. 14 by reference numeral 3. The pressure bar in any case has a portion pressingly engagable with a log because said bar is divided into a plurality of fingers which are aligned with the annular recesses 9 of the drive roller 5. In the arrangement depicted in FIG. 2, a number of pressure bar members 3 are shown to be fixed to the pressure bar support 8 and received in the corresponding recesses 9 of the drive roller 5. To state the relation between the drive roller 5 and the pressure bar 3 in another way, each of the edge members 10 carried on the drive roller faces a log through one of a plurality of slots extending vertically in the pressure bar and, therefore, the fingers of the pressure bar and the edge members of the drive roller alternate each other in engagement with the log. In the embodiment shown in FIG. 1, the pressure bar 3 is mounted on the pressure bar support 8 while its slots extend from a position ahead of the drive roller 5 towards the cutting edge of the knife 2. The pressure bar 3 may be supported either rigidly or resiliently and the resilient mounting structure will advantageously cut a log having many knars. The spacing between the pressure bar 3 and the knife 2 is freely selectable with a mechanism adapted to set the magnitude of compression matching with the intended thickness of a veneer sheet by moving the pressure bar towards and away from the knife. The veneer lathe according to the present invention reduces wedging of slivers and chips. If necessary, the lathe may further be provided with a mechanism for automatically adjusting the cutting depth of the edge members 10 into a log in accordance with the change of the log diameter and a relief angle adjusting mechanism, which is one of the usual mechanisms in veneer lathes. The arrangement shown in FIG. 1 further includes guide members 20 each having a surface 21 for guiding the slivers of the log 1 or the veneer sheet 6 away from the drive roller 5. Commonly mounted on the pressure bar support 8, the guide members 20 are received in the respective recesses 9 of the drive roller with their surfaces 21 facing the path defined between the drive roller 5 and the knife 2 or knife support 4. The guide members 20 cooperate to promote the smooth release of a veneer sheet from the edge members 10 while minimizing the cracking of the veneer sheet attributable to the edge members 10. Another effect obtainable with the guide members 20 is that the veneer sheet or slivers and chips are restrained from being carried by the drive roller 5 back to the cutting position. This would otherwise result in an abnormal increase in the pressure force with which the log is pressed. Though it is not always necessary to dispose the guide members 20 in all the recesses of the drive roller 5, they should preferably be located on opposite sides of each edge member 10 in the form of narrow elongate strips. The lathe shown in FIGS. 1 and 2 additionally include a member 22 for retaining the knife 2, chain sprockets 23 and 24 and a trimming knife slot 25.

As described hereinabove, major components of a veneer lathe according to the invention are the knife 2 for cutting a log, the support 4 for holding the knife 2, the drive roller 5, the drive roller supporting members including the pressure bar support 8 and bearings 19, the drive roller drive mechanism including the chain 11 and motor 12, the pressure bar of any suitable configuration and the mechanism for feeding the knife support 4.

Figure 7:
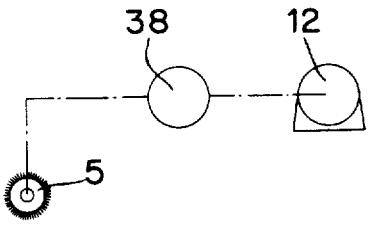
FIGS. 7 and 8 illustrate other examples of a drive mechanism for the drive roller.

Referring now to FIG. 6, there is illustrated an example of a second drive mechanism for a veneer lathe embodying the present invention. The second drive mechanism includes the motor 12 adapted to feed power to part of the outer periphery of the log 1 immediately ahead of the cutting section by driving the drive roller 5 engaged with the log. Denoted by reference numeral 27 is a first drive mechanism which causes the log 1 to be driven through a spindle 28. The first drive mechanism is equipped with an idling mechanism. A feed mechanism 29 connectes the first drive mechanism 27 with a feed screw 30 which is associated with the knife support 4 and which the mechanism 29 drives. Thus, the amount of feed of the knife supports by the feed screw 30 is determined in faithful relation with the rotation of the log. Major components of the feed mechanism 29 are a gear box and its associated members so that the thickness of an intended veneer sheet is determined by selecting the gears for use. In principle, power supply through the spindle 28 is not required with a veneer lathe of the present invention. However, the first drive mechanism 27 will ensure effective log rotation before the cutting of a log having an uneven outer peripheral shape because such a log can not readily be driven by the drive roller 5, alone. Even though the log may have a generally cylindrical section as after rough turning, it must rotate before the start of a cutting operation except the case where the position of the drive roller 5 is preset such that, when the knife support 4 is moved towards the log, the edge members 10 is brought into contact with the log before the knife 2. The power supplied from the first drive mechanism may be interrupted after the log is driven or may be continuously fed to assist in the log drive. Further, a lathe of the present invention includes the log idling mechanism in addition to the aforementioned major components. There will now be discussed the technique employed for matching the first drive mechanism with the second drive mechanism with respect to their power supply. The first drive mechanism 27 may be provided with an automatic spindle speed control mechanism in order to establish constant relation between the peripheral speed of the log 1 derived from the drive roller 5 and the speed derived from the first drive mechanism 27. In practice, the spindle speed may be controlled by a D.C. electric motor or any other variable-speed motor. Where the spindle speed is controlled such that the peripheral speed of the log provided by the first drive mechanism 27 normally remains higher than the one provided by the second drive mechanism, the drive roller will assist the first drive mechanism in the power supply. Where, on the other hand, the peripheral speed provided by the first drive mechanism is kept lower than the one provided by the second drive mechanism, the first drive mechanism will assist the drive roller in the power supply. Such mutual assistance is readily attainable if the power capacity of the second drive mechanism or the first mechanism is designed to be insufficient for cutting a log without the assistance of the other, if one or both of the power capacities are limited or if a variable-speed motor such as a D.C. motor is needed. In this respect, as shown in FIG. 7, a slippable torque limiter 38 may be included in the second drive mechanism for the drive roller 5 to limit the transmission torque in conjunction with motor 12. In this case, accurate control is not necessary. If this is the case, the peripheral speed of the log provided by the first drive mechanism will normally be held greater than that derived from the second drive mechanism. Concurrently, though not shown, a torque limiter may be equipped in the first drive mechanism. This provision should be in a position closer to the drive source than to the point where the lines to the spindle 28 and feed screw 30 branch off. In this case, the first drive mechanism will drive the log at a peripheral speed normally lower than that provided by the second drive mechanism or drive roller 5. The torque limiter in the first drive mechanism 27 is advantageous over the torque limiter 38 because it limits the torque transferred through the spindle and therefore avoids damage to the log. The torque limiter in the first drive mechanism will make the automatic peripheral speed control mechanism redundant if the first drive mechanism 27 is designed to drive the log at a peripheral speed higher than that obtainable with the drive roller 5 and preset with respect to the expected minimum diameter of the turning log. However, the absence of the peripheral speed control mechanism tends to increase the amount of slippage resulting in fast mechanical wear of the torque limiter as well as electrical waste. To facilitate setting of the transmission torque in accordance with the quality of a log, the torque limiter may comprise for example an electromagnetic clutch which adjusts the torque.

Designated 32 in FIG. 6 is an auxiliary drive roller pressingly engagable with the outer periphery of the log 1 opposite the drive roller 5. A drive mechanism 34 is associated with the roller 32 and, together with the roller 32, can replace the first drive mechanism 27. In the case where the roller 32 is idled and not driving the log 1 such condition thereby basically eliminating the control for matching the second drive mechanism and the first drive mechanism with each other. Where the first drive mechanism is employed, the spindle 28 and the feed screw 30 will be connected with each other and the feed mechanism is operated by the roller 5 or 32 through the spindle 28. The roller 32 may be replaced by a belt or the like.

Figure 8:
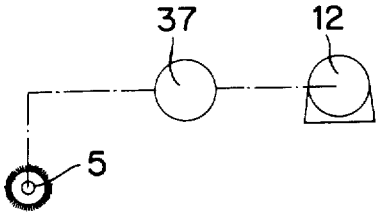

As viewed in FIG. 8 an overruning device 37 may be provided in the second drive mechanism for the drive roller 5. The device 37 is adapted to avoid friction which would otherwise result from a difference between the peripheral speed of the log 1 and the drive roller 5 at the start of a cutting operation. Before being cut by the knife, the log is caused to rotate at a peripheral speed higher than that of the drive roller 5. Upon start of the cutting action, the peripheral speed of the drive roller 5 is increased by the log with the aid of the device 37 whereafter, due to the cutting resistance, the peripheral speed of the log falls and the drive roller starts to supply power to the log. The overrunning device 37 may be provided to the first drive mechanism on the same principle. Where the first drive mechanism is provided with the overrunning device, cutting with the drive roller 5 alone may be started simultaneously with the power supply from the drive roller. In this case, the first drive mechanism will be designed to drive the log at a peripheral speed normally higher than the one provided by the drive roller. While in the above case the power supply from the first drive mechanism 27 is interrupted automatically, there may be employed a power cut-off mechanism including an electromagnetic clutch or the like for electric or mechanical control.

Another example of the drive system is illustrated in FIG. 10. In this example, the idle mechanism for causing the log to idle or drive through the spindle 28 is provided in association with the spindle. The system also includes, in association with the first drive mechanism, an automatic spindle speed control mechanism adapted to maintain the log peripheral speed due to a torque given by the mechanism 27 normally higher than the one provided by the drive roller 5.

Where the first drive mechanism 27 is desired to drive the log at a peripheral speed which is normally lower than the peripheral speed provided by the drive roller 5, the control mechanism accurately reduces the slippage of the motor. This requirement may be met by the system shown in FIG. 10 which includes a slippable electromagnetic clutch or any other mechanically or electrically operated torque limiter located in a position closer to the drive source or motor of the first drive mechanism 27 than to the point where the drive lines from the mechanism 27 to the spindle 28 and the feed mechanism 29 (including feed screw 30) branch off. The use of the torque limiter enhances the prevention of damage to the log because the torque transferred through the spindle 28 is limited positively. The above-mentioned location of the torque limiter is necessary to feed the knife support 2 in faithful relation with the rotation of the spindle or log. The torque limiter may be provided with a torque adjusting mechanism as a clutch controlled pneumatically, hydraulically or electromagnetically. This will limit the torque transferred through the spindle in accordance with the strength and quality of a log. Thus, the power supplied from the drive roller 5 can be assisted by the power from the spindle at a magnitude moderate enough to avoid breakage of the log.

Figure 11:
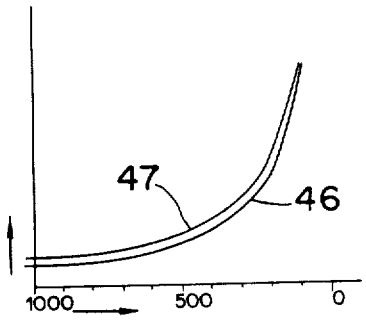
FIG. 11 is a graphical representation of the relationship between the spindle speed and the log diameter.
Figure 12:
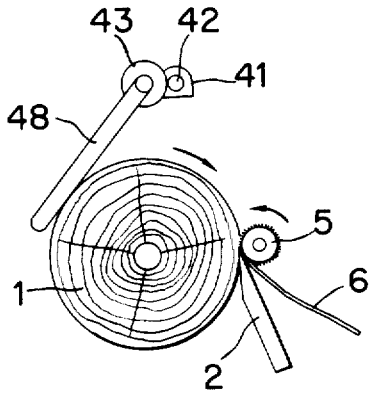
FIG. 12 shows another example of an automatic spindle speed control mechanism.
Figure 13:
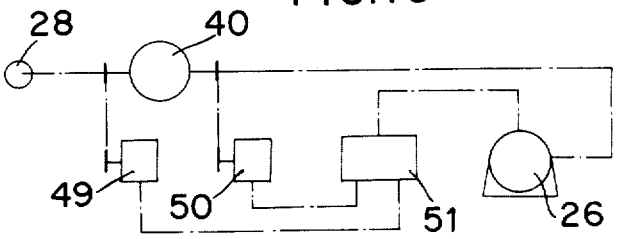
FIG. 13 shows a farther example of the automatic spindle speed control mechanism.

FIG. 10 also shows a practical example of the automatic spindle speed control mechanism. The mechanism comprises a unit 41 for setting the operational speed of the motor of the first drive mechanism 27 which in this instance consists of a variable-speed motor as exemplified by a motor having a change-speed gear or a D.C. motor. The speed setting unit 41 is fixedly mounted on the framework (not shown) of the veneer lathe. A gear 42 is provided to the unit 41 and held in driven mesh with a gear 43 which in turn carries an arm 44 rigidly therewith. The arm 44 is engaged with another arm 45 secured to the knife support 4. When the knife support 4 advances towards the spindle 28 in accordance with the progress of the cutting operation, the arm 44 will be caused to move angularly thereby driving the speed setting unit 41. It will thus be understood that the revolution speed of the spindle 28 is increased in inverse proportion to the distance between the knife and the axis of the spindle or the diameter of the log. The arm 44 may be fixed directly to the rotatable shaft of the speed setting unit 41 if desired. The automatic spindle speed control mechanism of the above type achieves the objective with an advantageously simple construction. Another advantage resides in that, since the rotation rate of the unit 41 becomes larger in accordance with the decrease in the log diameter, the revolution of the spindle can be speeded up in inverse proportion to the log diameter with the progress of the work, even if the unit 41 is of a type controlling the motor speed, in a linear fashion. To further enhance the accuracy of the spindle speed control, a curvilinear surface may be provided to that part of the arm 44 which remains in engagement with the arm 45. FIG. 11 is a graph representing the relationship between the spindle speed indicated by the ordinate and the log diameter indicated by the abscissa. In case where the drive roller 5 is rotated at a constant speed for constant-speed cutting operation, the revolution speed of the spindle 28 will increase as indicated by curve 46 in FIG. 11 in accordance with the decrease in the log diameter. However, it is more preferable to increase the spindle speed as curve 47 shows in order that the first drive mechanism 27 may drive the log normally at a lower speed. The same concept of design modification is applicable to the case wherein the spindle is controlled to a lower speed. The difference between the intended spindle speed derived from the first drive mechanism 27 and its actual speed is reflected by the slippage of the drive source, per se, or the torque limiter. Another example of the automatic spindle speed control mechanism is depicted in FIG. 12. This alternative mechanism comprises an arm 48 engaged with the log 1 as well as the speed setting unit 41 and gears 42 and 43. The gear 43 is secured to the arm 48 and drives the gear 42. In the case of a lathe having a torque limiter in its first drive mechanism 27, there may be employed an automatic spindle speed control mechanism shown in FIG. 13 which includes a torque limiter 40, speed sensors 49 and 50 responsive to input and output speeds of the torque limiter respectively and a controller 51. The controller 51 in response to outputs of the speed sensors 49 and 50 controls the motor 26 such that the input speed of the torque limiter always remains higher than the output speed. Other mechanisms applicable to such a case include a torque meter, a strain meter, a watt meter or the like and each increases the spindle speed with the progress of the cutting work so that a positive load acts continuously on the motor 26 or any other drive source.

Constructed as above, the first drive system facilitates smooth cutting of various kinds of logs by making effective use of the power supply from the idle mechanism within a range permissible for minimizing log damage. Where the mechanism for automatically controlling the cutting depth of the edge members of the drive roller 5 is omitted, the cutting depth will decrease progressively in accordance with the decrease of the log diameter tending to lower the log driving ability of the drive roller. This tendency is countered by the power supplied by the first drive mechanism 27. Particularly, a torque limiter if provided to the mechanism 27 will accurately limit the torque transferred through the spindle so that breakage of the log becomes negligible. Stated in another way, hard logs for example will be cut quite effectively if power is supplied through the spindle to assist the power supply from the drive roller 5 as long as the log remains free from damage. Meanwhile, where it is desired to turn a log having a semicircular split or like defects which interrupt the cutting action substantially simultaneously over the entire length of the log, the device roller may fail to overcome the resistance of such defects. This can be compensated for effectively by the inertia energy of the log and the power supply from the first drive mechanism 27 through the spindle. Concurrently, the power transferred through the spindle works effectively to keep the drive roller 5 free from the loads attributable to the rotator of the log and the action of the feed mechanism.

Figure 9:
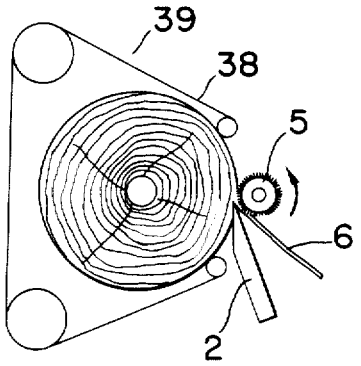
FIG. 9 shows an example of a mechanism for avoiding local break-away of a log.

It will thus be appreciated that, feeding a power to that part of the outer periphery of a log immediately ahead of the cutting section, a veneer lathe according to the embodiment discussed above can cut a log having a number of splits and achieve a smooth cutting action except for local break-away of a log. FIG. 9 shows an example of a mechanism adapted to avoid the local break-away of a log. The mechanism generally designated 39 comprises a plurality of endless belts 38 trained over rollers and covering the outer periphery of the log from a position immediately past the cutting section over to a position immediately ahead of the cutting section. The mechanism 39 is demountable to facilitate loading of a log in the lathe. With the mechanism 39, a log can be turned smoothly with hardly any wedging of slivers.

It should be noted that the second drive mechanism is the essential member for supplying power to the log but the first drive mechanism for the power supply may be provided in a modification of the invention. In any case, the power or torque transferred through the chuck can be reduced significantly and therefore the chuck can be substantially prevented from racing. Because the power from the drive roller is fed to a log in a position immediately ahead of the cutting section, a force otherwise tending to damage the log is markedly reduced even though the log may have a number of splits. The log can therefore be cut off smoothly to a small diameter without being damaged. Consequently, even logs which have hitherto been considered unsuitable for plywood production can be turned to enhance the yield. Another advantage obtainable with the veneer lathe is that, since the edge members on the drive roller are driven at suitable spacings from the pressure bar, the possibility of wedging of slivers and chips is small so that veneer sheets of a favorable quality are producible with the operation rate of the machine increased. The reduced possibility of wedging adds to the prevention of the damage to logs while providing a fair chance of automatic operation of a veneer lathe. Additionally, veneer sheets obtainable with the veneer lathe are soft due to the tendering effect afforded by the drive roller and, therefore, can readily be used for subsequent machining steps.

Figure 14:
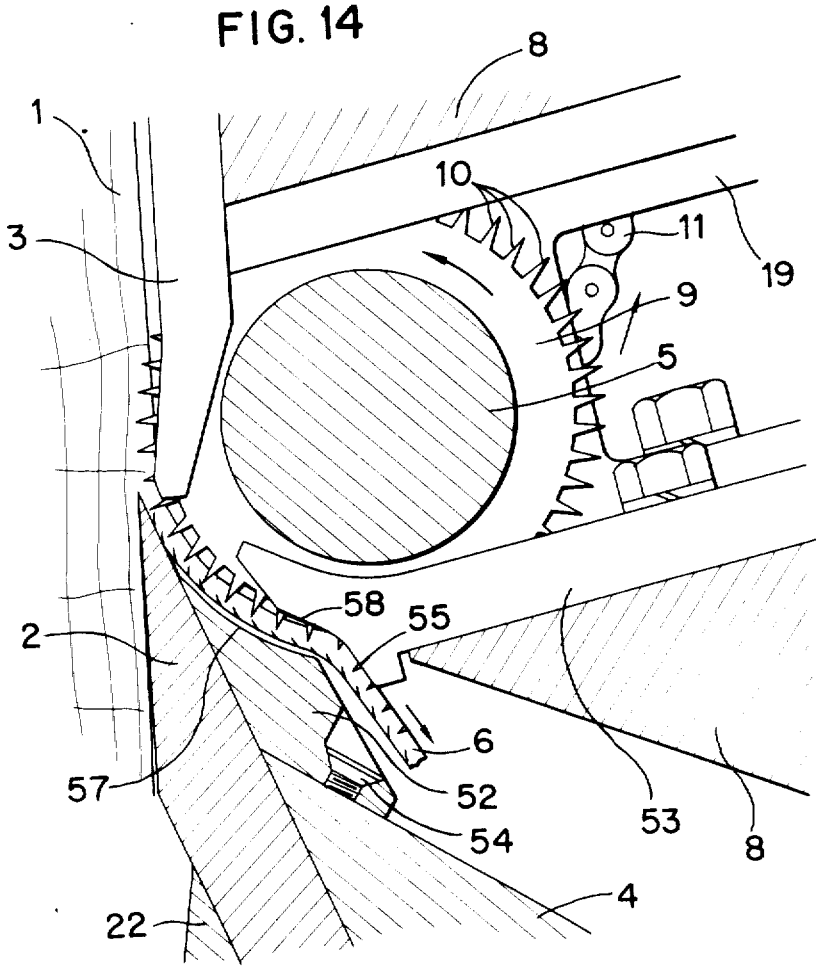
FIG. 14 is a view similar to FIG. 1 but showing a modified embodiment of the present invention.
Figure 15:
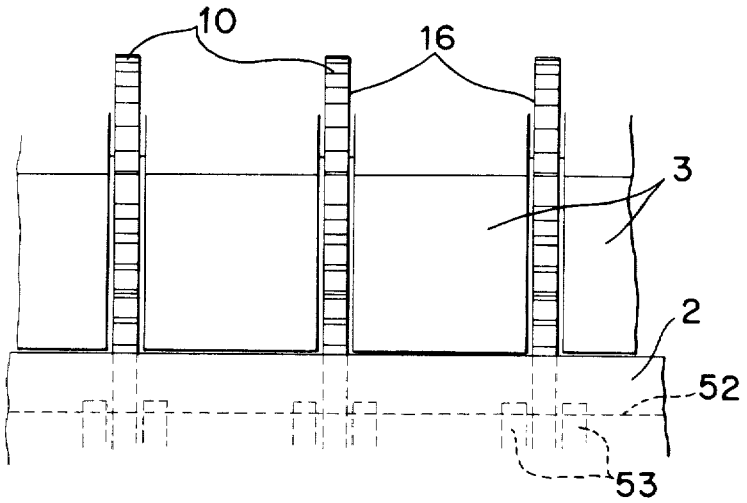
FIG. 15 illustrates the relationship between edge members and bending members with the arrangement shown in FIG. 14.

A modified embodiment of a veneer lathe according to the invention is illustrated in FIG. 14. The modification includes, in addition to the major components described hereinbefore in conjunction with the first embodiment, an arrangement for providing exactly flat veneer sheets by further increasing the tendering effect. The arrangement includes a projection 52 mounted on the knife support 4, and a bending member 53 provided at each recess of the drive roller. The projection 52 and bending members 53 define therebetween a curved passage which, by bending the veneer sheet from the side of the drive roller 5 to that of the knife 2 serves to enlarge splits on that surface of the veneer sheet facing the drive roller 5. While the projection 52 is shown in FIG. 14 as being secured to the knife support 4 by means of screws 54, the projection may be secured in the knife 2 by any other suitable mounting means. The projection 52 may be provided with a width which is substantially the same as that of the knife 2. Alternatively, it may consist of separate pieces positioned locally along the width of the knife 2 and, furthermore, it may be disposed locally below each of the edge members 10 on the drive roller 5. The local disposition of the projection below the edge members 10 is advantageous among others since it aids in further reduction of the possibility of the veneer sheet plugging the path. The projection 52 has a slant surface 57 which may have a curvature concentric with the outer periphery of the drive roller 5 as viewed in the drawing to define a smoothly curved passage. Each member 53 on the other hand has a slant surface 55 adapted to bend the veneer sheet 6 towards the projection 52. The bending member 53 may also functions as guides which remove slivers and chips of the log from the edge members 10 along their slants 55. Each of the bending members 53 is received in one of the recesses 9 of the drive roller 5 and may have the slant 55 connected smoothly with a surface 58 which guides the veneer sheet or slivers smoothly away from the drive roller. This will promote further smooth removal of chips and slivers from the edge members 10 and bending of the veneer sheet. To ensure the discharge of slivers and chips from the edge members 10, it is preferable as shown in FIG. 15 to locate the bending member 53 on one or opposite sides of each edge member 10 at a small spacing or spacings. The walls defining said passage may be formed of a material having a low coefficient of friction to facilitate further smooth removal of the veneer sheet. If desired, the coefficient may be lowered by suitably treating the surface of the walls. The bending member 53 may take the form of a rotatable body with a view to reducing the resistance to the bending effort. If necessary, a mechanism (not shown) for reciprocating the bending members 53 may be employed in order to adjust the radius of curvature of the veneer sheet or the relative position of the projection 52 and bending members 53.

The modified embodiment of the invention described above achieves a positive tendering effect in addition to the advantages discussed in conjunction with the first embodiment, producing veneer sheets which are substantially flat. Experiments showed that even a veneer lathe according to the first embodiment could render veneer sheets flat with the tendering effect afforded by the drive roller, but some qualities of logs gave veneer sheets of insufficient flatness. In contrast, a veneer sheet in the modified embodiment is not only tendered by the drive roller but additionally bent to have the splits enlarged. We found that the resultant tendering effect is sufficient enough to provide completely flat veneer sheets. According to the modified arrangement, there is hardly any chance of wedging of a veneer sheet because the edge members on the drive roller feeds the sheet with a large force.

What is claimed is:

1. A veneer lathe comprising: [means for rotatably supporting a log by means of a spindle at its axial ends] *means for supporting a log rotatably about its axis by means of a spindle*, and said means being connected to a first drive mechanism for rotating said log;

a knife, having a knife edge, adapted to be oriented in a tangential relation to said log, with said knife edge being substantially near a point of tangency, and extending along the log's axial length;

at least one drive roller provided slightly ahead of said knife edge in a facing relation to said log, and said drive roller being connected to a second drive mechanism;

a plurality of edge members mounted on said drive roller around the outer periphery thereof in a plurality of rows;

pressure means provided on at least one side of each said row for pressing said logs slightly ahead of said knife edge;

means for increasing the speed of revolution of said log supporting means in accordance with a decrease in a log's diameter; and means for feeding the drive roller, the knife, and said pressure means toward said log such that said edge members on said drive roller come into piercing engagement with the log surface slightly ahead of said knife edge to turn said log, and said feeding means being adapted to continue the feed in accordance with the decrease in the log's diameter.

2. A veneer lathe according to claim 1, further including sensor means for detecting the log's diameter.

3. A veneer lathe according to claim 2, in which said revolution increasing means includes a variable speed motor.

4. A veneer lathe according to claim 1, in which said second drive mechanism is provided with an overrunning mechanism.

5. A veneer lathe according to claim 1, further including guide means provided downstream of said pressure means to guide a cut veneer out of piercing engagement with the edge members.

6. A veneer lathe according to claim 1, in which said edge members are adapted to stay in piercing engagement with a cut veneer sheet immediately past the knife edge.

7. A veneer lathe according to any one of claims 1-6, including an idling mechanism adjustable so as to transmit a variable torque, to said spindles and wherein the second drive mechanism is equipped with an adjustable torque limiting mechanism and that the peripheral speed of said log due to a torque given by said second drive mechanism is normally higher than the log speed due to the torque given by the idling mechanism.

8. A veneer lathe, according to claim 1, wherein said first mechanism includes an idling mechanism equipped with an adjustable torque limiting mechanism capable of transmitting a variable torque and that the peripheral speed of said log due to a torque given by the idling mechanism is set to be normally higher than a log peripheral speed given by the second drive mechanism.

9. A veneer lathe according to claim 7 wherein said idling mechanism is equipped with an automatic monitoring mechanism adapted to set the log peripheral speed due to the idling mechanism at a higher level than the log peripheral speed due to the second drive mechanism.

10. A veneer lathe according to claim 7 wherein said idling mechanism is equipped with an automatic monitoring mechanism adapted to set the peripheral speed due to the idling mechanism at a lower level than the log peripheral speed due to the second drive mechanism.

11. A veneer lathe according to claim 1, wherein there is further provided a monitoring mechanism for controlling the revolution of the spindle in accordance with the distance between the knife and the log axis or the log diameter whereby the log revolution is adapted to increase in inverse proportion to the distance between the knife and the log axis or the log diameter.

12. A veneer lathe according to claim 1, including recesses provided in said drive roller between the rows of said edge members, and a guide member provided at each recess having a guide surface adapted to guide the cut veneer away from the engagement with the edge members.

13. A veneer lathe according to claim 12 wherein there is provided further a bending member at each recess, between said rows of said edge members, in said drive roller, and each bending member having a slope to guide the cut veneer sheet away from the engagement with the edge members and bend a cut veneer sheet in the direction of the knife.

14. A veneer lathe according to claim 13, wherein there is further provided a projection mounted on the knife support in a facing relation with said bending members.

15. A veneer lathe according to claim 1, wherein said pressure means include pressure bars having a portion pressingly engageable with said log.

16. A veneer lathe according to claim 15, wherein said pressure bars are adapted to resiliently abut against the log.

17. A veneer lathe according to claim 5, wherein said guide means comprises a plurality of guide members, each guide member being provided on at least one side of the edge members of said plurality of rows and including a projection mounted on the knife and a bending member provided in the vicinity of the periphery of the drive roll and having a concave surface in a facing relation to said projection.

* * * * *